United States Patent [19]

Davis

[11] 4,305,555
[45] Dec. 15, 1981

[54] SOLAR ENERGY SYSTEM WITH RELAY SATELLITE

[76] Inventor: Charles E. Davis, Iyopawa Island, Coldwater, Mich. 49036

[21] Appl. No.: 843,834

[22] Filed: Oct. 20, 1977

[51] Int. Cl.³ .............................................. B64G 1/10
[52] U.S. Cl. ............................... 244/158 R; 244/173;
250/215; 136/292; 322/2 R; 307/149;
331/DIG. 1
[58] Field of Search ................. 244/158, 62, 159, 172,
244/173, 168; 60/641; 126/424, 417, 438, 439,
449; 250/212, 215; 350/293, 289, 299; 307/43,
149, 153; 310/4; 322/2 R; 325/4, 26, 37, 115;
343/915, DIG. 2; 331/94, 94.5, DIG. 1;
136/292; 290/1 R

[56] References Cited
U.S. PATENT DOCUMENTS 3,535,543 10/1970 Dailey ................................. 244/159
3,781,647 12/1973 Glaser ................................. 244/159
3,933,323 1/1976 Dudley et al. ...................... 322/2 R
4,078,747 3/1978 Minovitch ........................... 244/159

OTHER PUBLICATIONS

Stirn, Richard J., "Schottky Barrier Laser Energy Converter", NASA NPO-13390-1 Microfische 1974.
Hansen et al., "Laser Power Stations in Orbit", Astronautics and Aeronautics, Jul. 1972, pp. 41–55.
Stampfl, "Relay Satellite System", 1970 IEEE International Convention, New York, Mar. 23–26, 1970.
Crowley, "Designing the Space Colony", M.I.T. Technology Review, Jul./Aug. 1977, pp. 45–49, 50.

Primary Examiner—Galen L. Barefoot

[57] ABSTRACT

A system for beaming solar energy from space to an earth location and putting it to useful work either as heat or light energy, or by converting it into some other form of energy such as steam or electrical power. In the system illustrated, a receiver satellite is in polar orbit and a relay satellite is in equatorial orbit, rotating with the earth and therefore stationary with respect to earth location. Solar energy is collected by the receiver satellite through an array of parabolic collectors and focused by a series of mirrors onto a coherent radiation energy generator, preferably a laser beam generator. The laser beam is directed by a mirror to another mirror on the relay satellite which redirects it to a selected earth location. Alternatively, the relay satellite may convert the laser beam to a maser beam to better penetrate clouds, smoke and haze at the earth location. The mirrors on the two satellites are mounted on gimbals and are power-operated under continuous automatic telemetry control between the satellites and the ground to direct the laser or maser beam to the eath location. Provision is made on one of the satellites for modifying the beam through a constructive interference filter or a diffuser-/expander lens, or both, to regulate the kind of energy and the area covered at the earth location.

12 Claims, 7 Drawing Figures

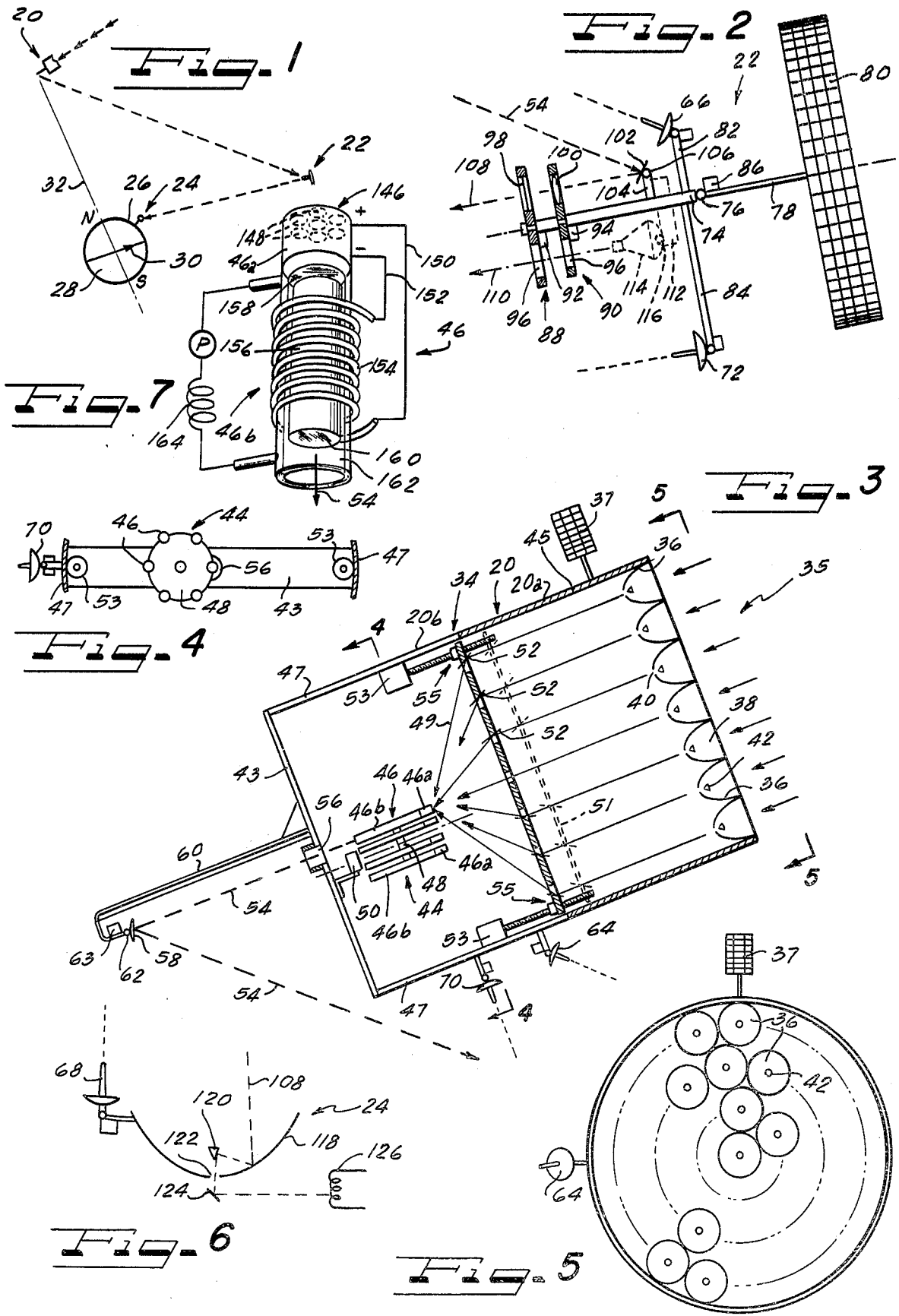

SOLAR ENERGY SYSTEM WITH RELAY SATELLITE

BACKGROUND OF THE INVENTION

The invention belongs to the field of energy modification and transmission, particularly to the transmission of solar energy from space to an earth location.

Apparatus for converting solar energy into other forms of energy such as laser and maser beams has been well developed. For example, by a multi-step process, an electrical current can be generated in a circuit containing photovoltaic or thermal converters, or both, exposed to sunlight, and this current can be applied to a laser to produce a narrow, intense beam of coherent (single frequency) light, sometimes referred to as a laser beam. In the microwave region, the corresponding device is called a maser, and the similar narrow intense beam of microwave energy is called a maser beam characterized by ability to penetrate clouds, smoke and haze, as demonstrated by radar equipment. Apparatus for converting laser beams into electrical energy and generating maser beams with the electricity is readily made by known techniques, and techniques for placing apparatus precisely in polar and equatorial orbits are likewise well known, as well as automatic and manual telemetry controls between the earth and satellites, and between satellites, for remote control of altitude, attitude, speed, direction of travel, pitch, yaw, and operation of various components.

Techniques are well developed for placing a satellite in stationary position relative to some selected earth area so as to place it in equatorial orbit at the same rotational speed as the earth and in the same direction. However, this poses a problem because the earth shadows it at night, stopping the collection and transmission of solar energy. To solve this problem, elaborate heat sink devices and battery systems have been proposed to store heat energy in the sunlight and release it at night, as shown for example in Hanold et al U.S. Pat. No. 3,029,596. Another possibility would be to utilize three satellites spaced at 120° apart around the earth so that two would always be in the sunlight and could transmit to the one that happens to be in the earth's shadow at any particular time.

A still further problem in absorbing solar energy in space is the extremely high temperatures involved, requiring careful design to prevent the apparatus from being destroyed by the sun. Actual working temperatures of 2,100° Kelvin have been proposed for solar energy concentrators in space. Receivers operating at such temperatures require special and complex designs to minimize their tendency at these very high temperatures to reradiate a substantial portion of the collected heat energy, thereby degrading the efficiency of the apparatus.

SUMMARY OF THE INVENTION

It is a general object of the present invention to provide a solar energy system capable of transmitting energy from a satellite in space continuously, without the necessity of bringing energy from a storage reservoir or heat sink or batteries when the satellite is in the nighttime portion of its orbit. In the specific application illustrated, the system comprises a receiver satellite in polar orbit and a relay satellite in equatorial orbit, stationary with respect to a selected earth location to which the energy is transmitted. Solar energy is converted to coherent radiation energy in the receiver satellite and transmitted to the earth location via the relay satellite.

Another object is to absorb the solar energy in the receiver satellite through input parabolic collectors, each having a mirror element at its focus for directing solar radiation through an exit aperture to the inside of the receiver satellite to minimize the tendency to reradiate the collected energy to space from the receiving end of the satellite.

Another object is to provide means within the receiver satellite for focusing all of the solar radiation collected by the parabolic collectors into an operative position simultaneously directed onto a coherent radiation generating means to thereby generate a beam of coherent radiation energy and direct same toward the relay satellite.

Another object is to provide mirror means on the relay satellite for reflecting the coherent radiation energy directly from the receiver satellite to the earth location.

Another object is to provide means on the relay satellite for converting the coherent radiation energy received from the receiver satellite into another form of coherent radiation energy and transmitting this to the earth location.

Another object is to provide constructive interference mechanism on one or both of the satellites for modifying the frequency of the beam of coherent radiation energy transmitted therefrom.

Another object is to provide focusing and diffusing means on one of the satellites, preferably on the relay satellite, for modifying the intensity and size of the beam of coherent radiation energy transmitted to the earth location.

Another object is to provide a power generator at the earth location for converting the coherent radiation energy received from the relay satellite into a form of useful power such as electricity or steam.

Another object is to transmit power from the receiver satellite to the relay satellite in the form of a laser beam for maximum concentration of power transmission over long distances and to transmit power from the relay satellite to the earth location in the form of a maser beam for maximum efficiency of power transmission through clouds, smoke and haze.

Other objects and advantages will be apparent from the following description, taken in conjunction with the accompanying drawings, which discloses a preferred embodiment of the invention.

BRIEF DESCRIPTION OF THE DRAWINGS

FIG. 1 is a diagrammatic view of the system showing the receiver satellite in polar orbit, the relay satellite in equatorial orbit and the earth receiver at a fixed location on the earth;

FIG. 2 is a schematic view of the relay satellite;

FIG. 3 is a schematic view of the receiver satellite;

FIG. 4 is a cross-sectional view of FIG. 3 taken along line 4—4;

FIG. 5 is an end view of the receiver satellite showing the array of input parabolic collectors on the receiving face, as seen in the direction of the arrows 5—5;

FIG. 6 is a schematic view of a receiver and power generator at the earth location; and FIG. 7 is a schematic view of one form of coherent radiation generator which may be employed with my invention.

Like parts are referred to by like reference characters.

DESCRIPTION OF THE PREFERRED EMBODIMENT

Referring now to the specific embodiment of the invention shown in the drawings, the solar energy system comprises a receiver satellite 20, a relay satellite 22, and an earth receiver and power generator 24 at an earth location 26. The earth 28 has N a S Poles defining and polar axis and the arrow 30 indicates the direction of rotation at the equator. The receiver satellite 20 is in a polar orbit at approximately 22,000 miles altitude and at approximately 7,000 miles per hour speed resulting in one orbit per 24 hours. As shown in FIG. 3, it has a housing 34 comprising a generally tubular shell having a closed input section 20a bounded by a cylindrical wall 45, and a relatively open output section 20b with a pair of side columns 47 and a cross strut 43. The housing input section has an array 35 of input parabolic collectors 36, 36 on the receiving face. Each of these collectors has a circular mouth, typically about 15 feet in diameter and 16⅔ ft. long along the central parabolic axis 38.

Each collector has an exit aperture 40 on the axis 38 opposite the mouth and a cone-like mirror element 42 at the focus to direct solar radiation through the exit aperture to the interior of the housing.

The array of parabolic collectors 36 may be expanded beyond the diameter of the receiver satellite if desired, for which the array of mirrors 52 and other mirrors, if needed, may be correspondingly expanded and suitably positioned to focus solar energy at a single operative position as shown in FIG. 3.

The parabolic collectors may be replaced by or used with other shapes or types of solar energy collectors such as arrays of silicon solar cells now commonly used in space as described in the October 1977 issue of "Smithsonian." A wide variety of such cells may be purchased as off-the-shelf items from a number of suppliers including Edmund Scientific Co., Barrington, N.J.

Coherent radiation generating means, generally designated 44, is located in the receiver satellite housing. This may be a singular or multiple unit as will now be described. In the present case, it comprises a "Gatling gun" arrangement of six individual coherent radiation generators 46 mounted on a frame 48 which is rotatable by a motor 50 attached to strut 43. More or less than six units 46 may be mounted on frame 48, as needed. The motor is actuatable to bring the generators 46 successively into the central operating position shown in FIG. 3 where all the beams of solar radiation from the exit apertures 40 are focused by mirrors 52 onto an operative position, namely, the receiving area of the generator.

The mirrors 52 are mounted on a plate 51 which is axially movable within the housing. Motors 53 move the plate 51 between the solid line operating position and the broken line non-operating position shown in FIG. 3. Each motor has a worm shaft engaging a threaded bushing on the plate, as shown at 55. Thus, on command, in case of a malfunction, the plate with mirrors 52 can be moved to the non-operating position where the mirrors will focus on an empty space short of the generator 46 and the crossing light beams 49 will be directed out into space between posts 47, thereby shutting down the energy transmission.

Each coherent radiation generator 46 is shown only diagrammatically, in block form, in FIG. 3, because the details comprise no part of the present invention. Briefly, however, and merely to show one example of such a generator 46 employing known techniques, refer to FIG. 7. Each generator comprises a receiving section 46a and an output section 46b.

Each receiving section 46a has a receiving area 146 with an array of solar cells 148 of any suitable type, for example, the silicon wafer type described in above-mentioned issue of "Smithsonian." The electrical output from these cells when they are exposed to solar radiation is applied through conductors 150, 152 to a flash lamp 154 surrounding a suitable resonator element such as a ruby rod 156. The latter has a reflective surface 158 at one end and a partially reflective surface 160 at the other emitting end. The ruby rod is contained within a cylindrical glass or quartz envelope 162 and cooled in a closed system by a pump and a radiator 164. The pump will be suitably powered by electrical energy generated in the receiving section 46a. According to well known principles, the ruby rod 156 emits an extremely narrow beam 54 of coherent radiation energy which, in the example described, would be a laser beam if its output is in the light frequency range. In the microwave region, the corresponding device would be a maser and would be generally as described above except that the energy emission would be at microwave frequencies.

Alternatively, solar cell electric generators may be substituted for the mirror elements 42 in the parabolic collectors 36 and the electric current conducted direct to the flash tube 156.

As a further alternative to the conventional unit shown in FIG. 7, it is my intention to use the sunlight from the array of parabolic collectors 36 directly in generating coherent radiation energy. In this case, the solar energy from the mirrors 52 would be focused directly on the resonator element 156 as a substitute for the flash lamp 154. The jacket or envelope 162 and the cooling system described may or may not be employed for such direct generation of coherent radiation energy.

Thus, when solar radiation is focused on any of the generators 46 as shown in FIG. 3, the beam 54 of coherent radiation energy, whether a laser or maser beam, will be produced at the outlet end and will be transmitted through the opening 56 in cross strut 43 to the output mirror 58 supported on bracket 60. The mirror 58 has a universal gimbal mounting 62 enabling it to be turned in all directions and it is movable by motor means 63 under the control of a conventional telemetry system. The mirror is automatically controlled by telemetry involving antennae 64 and 66 on the two satellites and antennae 68, 70 and 72 on the earth receiver and satellites respectively. These antennae are all provided with universal gimbal mountings and motor means similar to that described for the mirror 58 to maintain alignment of the antennae and telemetry control during all relative positions of the satellites with the ground and with one another. Additional antennae and telemetry controls (not shown) will be supplied, as needed, to monitor various functions, activate mechanisms, and control the positions and altitudes of the satellites. An array of solar panels supplies working or back-up energy for operating various functions on the receiver satellite. These details may be conventional and will not be further described here.

Examples which I prefer for the coherent radiation generator 46 will be a laser or a maser because they employ presently known technology. However, other coherent radiation generators of less well-known kinds may be employed. The beam 54 is characterized by a single light frequency capable of being transmitted over great distances with substantially no dispersion. By using a plurality of such generators 46, as shown, lasers or masers of different wave lengths may be optionally available for different purposes. Alternatively, some of the generators 46 may be masers.

As described, one of the characteristics of conventional lasers and masers is that they generate a great deal of heat. Cooling must be provided to limit destructive heat build-up. A further alternative here is to provide the generators 46 as substantial duplicates and control heat build-up by rotating the assembly 44 when heat builds up to a predetermined limit so that the generators 46 will constantly be moved from the central, effective position to another position where they can radiate leeward of the sun into space through the open output section 20b. It is recognized that this heat problem may be less of a problem in future coherent radiation generators so a plurality of them for the purpose of handling heat build-up may not be necessary. Thus, instead of the multiple "Gatling gun" arrangement described, only a single generator 46 may be needed.

Referring now to the relay satellite 22, this device is located in a "stationary" orbit above the earth location 26. It will orbit at slightly more than 22,000 miles altitude, one orbit per 24 hours, so as to remain fixed with respect to the earth location 26 and will be placed in the nearest position feasible to attain the best compromise between the shortest transmission route and avoidance of interference with other factors such as existing satellite paths and the Van Allen radiation belts. The orbits of the two satellites should be coordinated so that both are always in the same quadrant of the earth at the same time and the energy beam from the receiver satellite 20 is never directed toward the earth surface.

The relay satellite 22 is shown diagrammatically in FIG. 2. It comprises a housing 74 with a universal gimbal 76 connecting it to an extension 78 having an array 80 of solar panels which is preferably rotatable to maintain maximum solar exposure. This, together with storage batteries (not shown), comprises the power supply for the relay satellite, the solar cells being used on day side of the orbit and the storage batteries being used on the night side.

The telemetry antennae 66 and 72, previously described, are mounted on brackets 82 and 84 respectively.

Motor means 86, associated with the gimbal 76 and controlled by the telemetry system described, maintains the housing 74 pointed generally toward the earth so that energy will be beamed through the constructive interference filter and focusing and diffusing lens systems now to be described.

Wheels 88 and 90 are rotatable about the housing 74 by motor means 92 and 94 respectively. Wheel 88 is a diagrammatic representation of a constructive interference mechanism. Wheel 90 is a similar diagrammatic representation of a focusing and diffusing mechanism for purposes which will now be described.

Each wheel has a plurality of windows 96, at least one of which, in each wheel, is blank so that a light or energy beam can pass through it unchanged. Wheel 88 has a filter 98 capable of modifying a light or energy beam and permitting only certain frequencies to pass through it. The wheel 88 may have several of these filters, in different windows, for special effects as will be described.

Wheel 90 has a lens or sets of lenses 100 in each of several windows. Each lens is capable of narrowing or expanding the area at the earth, depending on the effect which is desired to be obtained.

The relay satellite housing has a mirror 102 supported on a bracket 104 by a universal gimbal mounting 106. This, as with the other gimbal mountings, is motor-operated and is universally adjustable under control of the telemetry system for receiving the beam 54 from the receiver satellite 20 and reflecting it through the wheels 88 and 90 as a beam 108 to the earth receiver 24. This structure is provided for a form of the invention in which the beam 54 of coherent radiation energy, as generated at the receiver satellite, is reflected directly to the earth location by the mirror 102.

An alternative form of the invention is illustrated by broken lines in FIG. 2. This figure illustrates a system in which the beam 54 is converted into another form of energy and emitted as beam 110. For example, in this case, the mirror 102 would either function as, or be replaced by, an input antenna receiving the laser beam 54. The laser beam would be processed in a combined converter and maser 112 and emitted through antenna 114 as a microwave maser beam 110. Gimbal 116 and an associated motor means (not shown) under control of the telemetry system would maintain the antenna 114 pointed toward the earth receiver 24. In operation, on a perfectly clear day, the system might be adjusted to merely reflect the laser beam 54 directly to the earth. Alternatively where heavy cloud cover, smoke or haze on the earth might diminish the effectiveness of laser transmission, it could be switched to maser transmission through the antenna 114.

If desired, the converter 112 may incorporate a "Gatling gun" type of coherent radiation generating means 44, as described for the receiver satellite—thereby providing a choice of different light and energy transmission from the antenna 114. It will be noted that the latter is aligned with the windows in the wheels 88 and 90, so that, if desired, the beam 110 may be appropriately modified as to frequency or coverage or both.

One of the primary applications of the system is to use solar power to generate power on the earth. This is illustrated in FIG. 6 where the beam 108 is received in a parabolic collector 118, reflected from a cone-like mirror element 120 through an exit aperture 122 and off a mirror 124 to a coil 126 to produce steam which may be used in a conventional power plant to run turbines and generate electricity. For this purpose, the maximum concentration of heat energy will be required for the collector 118. This might require wheel 88 in the relay satellite and the coherent radiation generating means 44 in the receiver satellite both to be rotated to positions enabling the maximum transmission of infrared energy, as an example of the variations in kinds of energy needs, and of the flexibility of the system to meet those needs.

As an alternative for the earth receiver and power generator 24, the steam coil 126 may be placed directly at the focus of the reflector as a substitute for the mirror element 120. As a further alternative, a cluster of solar cells may be substituted for mirror element 120 to generate electricity directly.

Among the other applications of the invention, the wheel 88 and assembly 44 may be adjusted for maximum heat transmission as described above, while the wheel 90 is adjusted to diffuse the energy over a relatively larger area. Heavy snowfall accumulations in metropolitan areas may be melted off or may be prevented from accumulating initially. Similarly, a diffused heat ray may be beamed onto a fruitgrowing region to prevent frost or to delay it until after the fruit has ripened and has been picked. In such cases, where early killing frosts usually appear at night, and heat rather than light energy is needed, wave lengths in the visible region (approximately 0.3 to 1.5 Ångstrom units) could be filtered out and wave lengths above about 3.0 Ångstrom units would be transmitted. Various wave length filters or constructive interference mechanisms might be employed in the wheel 88 to deliver the particular kind of energy desired for a specific end use.

The above-described system is illustrative of a small number of many possible specific embodiments of the invention. Numerous and varied other arrangements and methods can readily be devised in accordance with the principles disclosed herein without departing from the spirit and scope of the invention. One or more than one receiver satellites and relay satellites may be utilized depending on the results desired. For example, while only a single relay satellite 22 is shown and described, a cluster of them may eventually be required so that they could serve many different urban and rural uses simultaneously.

The embodiments of the invention in which an exclusive property or privilege is claimed are defined as follows:

1. A solar energy system comprising: at least one receiver satellite in polar orbit having means for
   converting solar energy to coherent radiation energy;
   at least one relay satellite in equatorial orbit, stationary
   relative to a selected earth location; and means for transmitting said coherent radiation energy
   from said receiver satellite to said earth location via said relay satellite.

2. A solar energy system according to claim 1 including means in said receiver satellite for converting solar energy to coherent radiation energy and transmitting said coherent radiation energy to said earth location via said relay satellite.

3. A solar energy system comprising:
   at least one receiver satellite in polar orbit having means for converting solar energy to coherent radiation energy;
   at least one relay satellite in equatorial orbit, stationary relative to a selected earth location; and
   means for transmitting coherent radiation energy to said relay satellite in the form of a laser beam, said relay satellite having first energy transmitting means for redirecting said laser beam to said earth location and second energy transmitting means for converting said laser beam to a maser beam and transmitting same to said earth location, and means on said relay satellite for selectively activating said first and second energy transmitting means.

4. A solar energy system comprising at least one receiver satellite in polar orbit and at least one relay satellite in equatorial orbit stationary relative to a selected earth location;
   said receiver satellite having a housing with an array of input parabolic collectors on a receiving face thereof, each of said collectors having an exit aperture and a mirror element at the focus thereof to direct solar radiation through the corresponding exit aperture, coherent radiation energy generating means in said housing effective in response to solar energy to generate a beam of coherent radiation energy, means within said housing for directing and concentrating all of the solar radiation from said exit apertures into an operative position simultaneously directed onto said coherent radiation generating means to generate a beam of coherent radiation energy and mirror means for directing said beam of coherent radiation energy toward said relay satellite;
   said relay satellite having a housing with means including mirror means for receiving said beam of coherent radiation energy from said receiver satellite and transmitting a beam of coherent radiation energy to said earth location;
   means at said earth location for converting the beam of coherent radiation energy so received into useful work;
   solar power operated means on both satellites for adjusting the positions of both of said mirror means;
   telemetry control means for said solar power operated means for directing said beam from the receiver satellite to the relay satellite and for directing said beam from said relay satellite to said earth location.

5. A solar energy system according to claim 4 in which said coherent radiation generating means comprises a plurality of individual coherent radiation generators, and means for moving said generators selectively into said operative position.

6. A solar energy system according to claim 4 in which filter means is provided on one of said satellites for modifying the frequency of the beam of coherent radiation energy transmitted therefrom.

7. A solar energy system according to claim 6 in which said filter means is located on the relay satellite.

8. A solar energy system according to claim 4 in which focusing and diffusing means is provided on one of said satellites for modifying the intensity and size of the beam of coherent radiation energy transmitted therefrom.

9. A solar energy system according to claim 8 in which said focusing and diffusing means is located on the relay satellite to modify the effect of said beam at said earth location.

10. A solar energy system according to claim 4 in which the beam of coherent radiation energy from the receiver satellite is a laser beam, said relay satellite has means for converting said laser beam to a maser beam, and the beam of coherent radiation energy from the relay satellite to the earth location is a maser beam.

11. A solar energy system according to claim 4 in which adjustment means is provided in the receiver satellite housing for selectively directing the solar radiation from said exit apertures away from said coherent radiation generator means and telemetry control means for actuating said adjustment means from the earth location.

12. A solar energy system according to claim 4 in which there is an earth receiver at said earth location, said earth receiver including power generating means for converting the beam of coherent radiation energy so received into another form of energy.

* * * * *

UNITED STATES PATENT AND TRADEMARK OFFICE
CERTIFICATE OF CORRECTION

PATENT NO. : 4,305,555
DATED : December 15, 1981
INVENTOR(S) : Charles E. Davis

It is certified that error appears in the above—identified patent and that said Letters Patent is hereby corrected as shown below:

In the "ABSTRACT", line 20, change "eath" to --earth--; and in lines 22 and 23, change "diffuser-/expander" to --diffuser/expander--.

In Column 3, line 10, change "a" to --and--; and in line 11, change "and" to --a--.

In Column 7, line 9, change "0.3 to 1.5" to --4000 to 8000--; and in line 10, change "3.0" to --8000--.

In Claim 1, change the line arrangement to read as follows:
    1. A solar energy system comprising:
at least one receiver satellite in polar orbit having means for converting solar energy to coherent radiation energy;
at least one relay satellite in equatorial orbit, stationary relative to a selected earth location; and
means for transmitting said coherent radiation energy from said receiver satellite to said earth location via said relay satellite.

In column 4, line 22, after the semicolon, add --and--.

Signed and Sealed this

Sixth Day of April 1982

[SEAL]

Attest:

GERALD J. MOSSINGHOFF

Attesting Officer     Commissioner of Patents and Trademarks